Dec. 6, 1949     P. G. FRERER     2,490,040
ACTUATOR

Filed Feb. 8, 1945     2 Sheets-Sheet 1

INVENTOR.
PAUL G. FRERER
BY
Jate and Harris

Dec. 6, 1949    P. G. FRERER    2,490,040
ACTUATOR
Filed Feb. 8, 1945    2 Sheets-Sheet 2
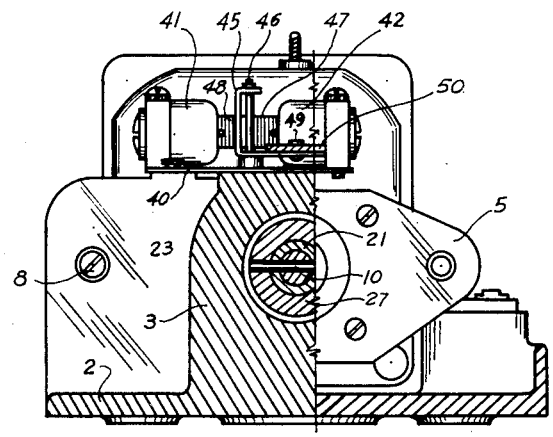
Fig. 4
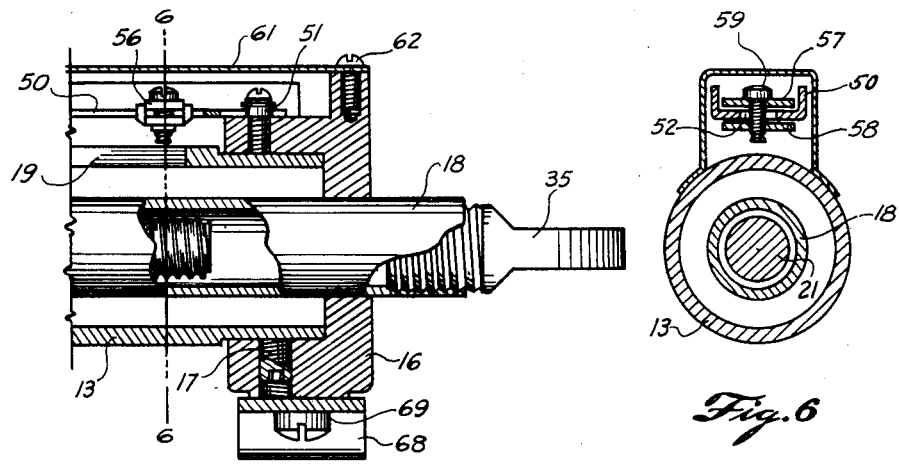
Fig. 5
Fig. 6
INVENTOR.
PAUL G. FRERER
BY
Jato and Harris Patented Dec. 6, 1949

2,490,040

UNITED STATES PATENT OFFICE 2,490,040

ACTUATOR

Paul G. Frerer, Towson, Md., assignor to Perfex Corporation, Milwaukee, Wis., a corporation of Wisconsin Application February 8, 1945, Serial No. 576,815

1 Claim. (Cl. 172—36)

This invention relates to power driven actuators for operating various devices such as dampers and valves.

The primary object of this invention is to provide a simple, compact, powerful and rugged actuator of the straight line motion type.

Other objects will appear from the following description and appended claims.

For a full disclosure of the invention reference is made to the following description and the accompanying drawings, in which, Fig. 1 is a plan view of the improved actuator with its covers removed;

Fig. 4 is a section taken on line 4—4 of Fig. 1;

Fig. 5 is a sectional view of one end of the actuator; and

Fig. 6 is a sectional view taken on line 6—6 of Fig. 5.

Figure 1:
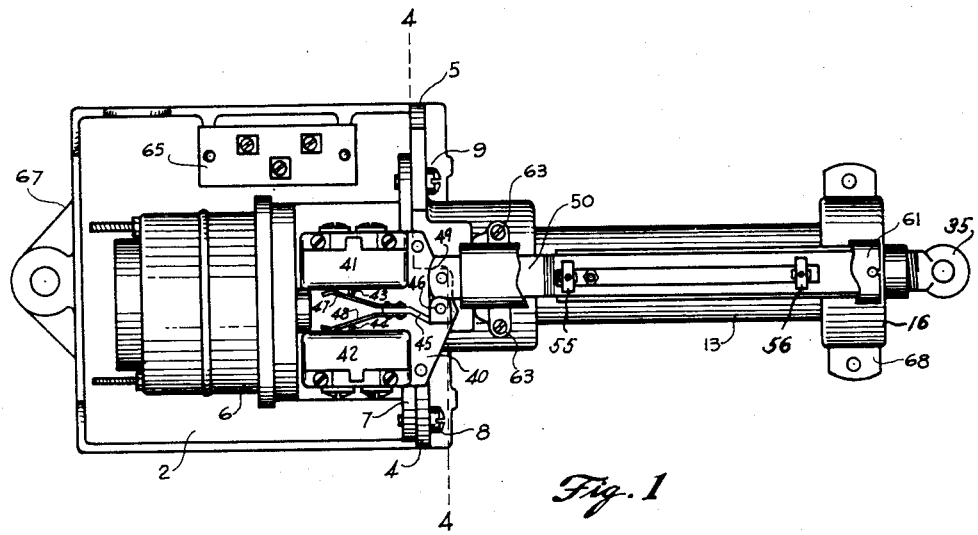
Figure 2:
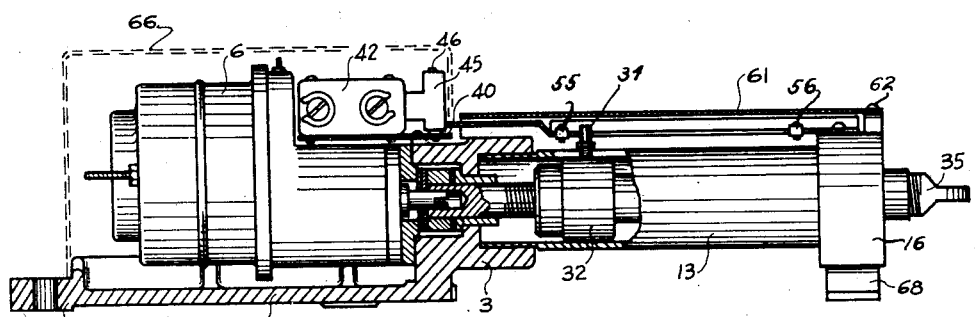
Fig. 2 is a side elevation, partly in section.

Referring to the drawings, reference character 1 indicates a base casting which is preferably generally L-shaped, having a generally rectangular base portion 2 and a transverse portion 3. The transverse portion 3 is formed with laterally extending ears 4 and 5 and serves as a mount for an electric motor and speed reduction unit generally indicated as 6. This electric motor and gear train unit may be of any suitable type commercially available and forms no part of the invention. This unit is suitably secured to a mounting flange 7, which in turn is secured to the ears 4 and 5 by means of bolts 8 and 9. The output shaft 10 of the electric motor unit extends into an opening 11 which is formed in the transverse portion 3 of the base member.

Figure 3:
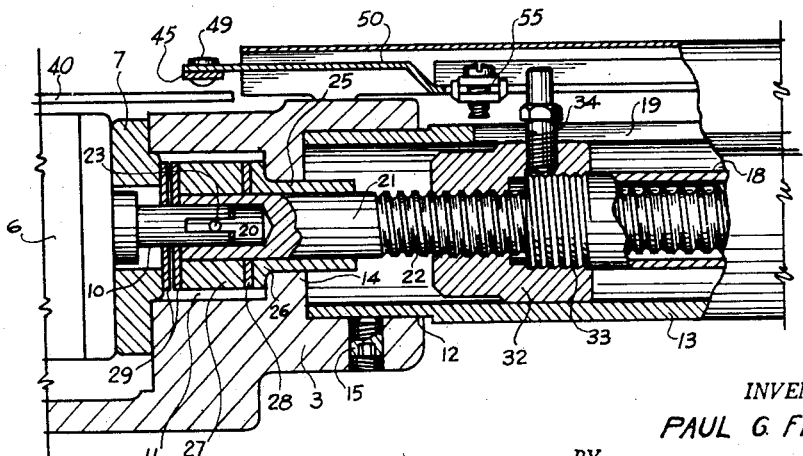
Fig. 3 is a fragmentary view similar to Fig. 2 on an enlarged scale.

As shown more clearly in Fig. 3, the transverse portion of the base is formed with an enlarged opening 12 for receiving a tubular housing member 13. This housing member abuts against a shoulder 14 and is held in place by means of a set screw 15. This tubular housing member at its other end is provided with a cap 16 (Fig. 5) which is held in place by a set screw 17. The cap 16 is provided with a circular opening which serves as a guide for a longitudinally movable shaft 18. The housing member is also provided with an elongated slot 19, the purpose of which will become apparent as this description proceeds.

The shaft 10 of the electric motor unit fits into a hollowed out portion 20 of a rotatable shaft 21 which is provided with screw threads 22. Preferably the motor shaft 10 is slotted so as to receive a pin 23 secured to the shaft 21, this providing for driving shaft 21 by the shaft 10. The left hand end of the shaft 21 is supported by a bearing 25 which is pressed into an opening in the shoulder 14 of the base. This bearing is formed with a flange 26 which abuts the shoulder 14 and also which serves as a thrust bearing. The shaft 21 is secured to a collar 27 which prevents longitudinal movement of this shaft. This collar 27 is interposed between thrust bearing washers 28 and 29. It will be noted that the thrust in one direction is restrained by the thrust bearing member 26 and that thrust in the opposite direction is restrained by washers 29 which bear against the motor mounting flange 7.

The threaded portion of the shaft 21 fits into a traveling nut 32 which is of approximately the same diameter as the internal diameter of the tubular housing member 13. This traveling nut 32 is provided with a threaded recess 33 which receives the screw-threaded end of the longitudinally movable shaft 18. The shaft 18 is additionally held in place in nut 32 by means of a set screw or stud 34 which extends upwardly through the elongated slot 19 in the housing member. It will be apparent that the longitudinally movable shaft 18 is supported and guided in its movements at two points, namely by the traveling nut 32 and by the cap 16 at the end of the housing 13. The longitudinally movable shaft 18 is provided with an eyelet 35 at its outer end which may be attached to any device to be actuated, such as a valve stem, damper lever, etc.

When the electric motor 6 operates in one direction it rotates the screw-threaded shaft 21 in the same direction, which causes the traveling nut 32 to travel to the right. This traveling nut is prevented from rotating by engagement of the pin 34 with one side of slot 19. The movement of the shaft 18 outwardly imparts a thrust on the shaft 22 in the opposite direction, which thrust is taken up by the thrust washers 29. When the electric motor 6 operates in the reverse direction the traveling nut is caused to move inwardly or to the left, thus pulling the shaft 18 inwardly. This imparts a thrust on the shaft 21 which is taken up by the thrust bearings 26 and 28.

For different applications of the actuator different amounts of travel are required. For example, if the actuator is used to operate a large damper it may be necessary to utilize substantially the entire travel of the motor. On another application or installation where the actuator operates a valve or stoker feed lever, a smaller portion of its travel may be required. In order to provide for complete flexibility in application, this invention provides a limit switch actuating mechanism which is readily adjustable. This limit switch mechanism will now be described.

Secured to the top of the transverse portion 3 of the base member is a plate 40. This plate carries a pair of limit switches 41 and 42 which are preferably of the enclosed snap action type. These switches 41 and 42 are located so as to face each other with their push buttons 43 and 44 substantially in alignment. These push buttons are actuated by means of a bell crank member 45 which is hinged to a post 46 secured to the plate 40. This bell crank member 45 preferably carries spring members 47 and 48 which engage the push buttons 43 and 44 respectively.

The other arm of the bell crank member is attached by a pin 49 to a longitudinally movable actuator 50. The left hand end of the actuator 50 is supported by the bell crank 45. The right hand end of this actuator is supported by the collar 16 (Fig. 5) and is freely held in place by means of a shoulder screw 51. As shown in Fig. 6, the limit switch actuator 50 is preferably of a channelled configuration and is provided with an elongated slot 52. The actuating member 50, it will be noted, is mounted adjacent and parallel with the elongated opening 19 in the housing 13. The slot 52 in the actuating member 50 is substantially the same length as the slot 19 and is in approximate registration therewith. The elongated slot 52 serves to receive a pair of adjustable abutment members 55 and 56. Each abutment member may be formed of a pair of plates 57 and 58 and a set screw 59 which is screw-threaded into the plate 58. It will be apparent that either abutment member may be moved simply by loosening screw 59 and moving the abutment to the desired location and retightening screw 59. Preferably the screws 59 are clinched so as to prevent complete removal of the abutments from the member 50. The abutments 55 and 56 are engaged by the pin 34 which is carried by the traveling nut 32. As the traveling nut 32 travels to the left, it engages the abutment member 55, thereby moving the member 50 longitudinally to the left. This rotates the bell crank 45 counterclockwise as seen in Fig. 1, this pressing the push button 44 of switch 42 inwardly for opening this switch. This switch 42 is wired in the motor circuit so as to prevent further travel of the motor in this direction. When the motor is operating in the opposite direction it will eventually cause the pin 34 to engage the abutment member 56. This will move the member 50 to the right and rock the bell crank 45 clockwise, as seen in Fig. 1, which pushes plunger 43 inwardly for opening the limit switch 41, which arrests further operation of the motor in this direction. It will be apparent that by adjusting the positions of the abutments 55 and 56 on the actuating member 50, the limits of motion of the shaft 18 may be determined.

Preferably the limit switch actuating member 50 is covered by a housing 61, one end of which is secured to the cap 16 by screw 62. The other end of this housing is attached to the base by screws 63. Also the electric motor 6, limit switches 41 and 42, and the terminal block 65 are enclosed by a cover 66, this cover being generally rectangular and fitting over the rectangular portion 2 of the base member.

The actuator may be mounted on any suitable support by means of an eyelet 67 which is preferably cast integral with the base member. The unit may be further supported by means of a mounting bracket 68 which is attached by screws 69 to the cap 16. In some installations in which the unit operates a pivoted lever it is desirable that the unit be pivotally mounted so as to rock about its pivot to compensate for the curved path of movement of the lever. In such case the unit will be mounted solely by means of a screw passing through the eyelet 67. In other installations it is desirable to have the actuator unit rigidly mounted. For such installations the unit will be mounted both by the eyelet 67 and the mounting bracket 68.

From the foregoing description it will be apparent that the present invention provides a simple and rugged actuator device which may be readily adapted for a large variety of different applications. While only a single embodiment of the invention is shown, it will be apparent that many changes may be made in the construction illustrated without departing from the invention. It is therefore desired to be limited only by the scope of the appended claim.

What is claimed is:

An actuator comprising a generally L-shaped base member having a longitudinally extending portion and a transverse portion, said transverse portion having an opening therethrough, a motor and gear train unit mounted on one side of said transverse portion and having an output shaft in alignment with said opening, a tubular housing member on the other side of said base member and in alignment with said opening, a rotatable threaded drive shaft within said housing and arranged to be driven by said output shaft, a hollow longitudinally movable shaft member surrounding the drive shaft and in threaded engagement therewith, said hollow shaft member being guided in its longitudinal movement at least partially by said housing member, a pair of limit switches for said motor, operating means for the limit switches comprising a longitudinally movable elongated limit switch actuator extending adjacent the housing member and parallel thereto, the housing member being formed with an opening adjacent said elongated member, means attached to the hollow shaft member and extending through said opening, said last mentioned means preventing rotation of the hollow shaft member and engaging said limit switch actuator.

PAUL G. FRERER.

REFERENCES CITED

The following references are of record in the file of this patent:

UNITED STATES PATENTS

| Number | Name | Date |
|---|---|---|
| 1,113,102 | Cheney | Oct. 6, 1914 |
| 1,428,300 | Scharpenberg | Sept. 5, 1922 |
| 1,870,793 | Collins | Aug. 9, 1932 |
| 1,891,545 | Kindervater | Dec. 20, 1932 |
| 2,366,739 | McCoy | Jan. 9, 1945 |